US012698798B2

(12) United States Patent
Hong et al.

(10) Patent No.: US 12,698,798 B2
(45) Date of Patent: Aug. 4, 2026

(54) STRUT BEARING ASSEMBLY FOR VEHICLE

(71) Applicant: ILJIN Co., Ltd., Gyeongju-si (KR)

(72) Inventors: Tae Ho Hong, Seoul (KR); Se Woong Jeong, Seoul (KR); Ig Jin Kwon, Seoul (KR); Byeong Hwan Kim, Seoul (KR); Ki Ho Kim, Seoul (KR)

(73) Assignee: ILJIN Co., Ltd., Gyeongju-si (KR)

( * ) Notice: Subject to any disclaimer, the term of this patent is extended or adjusted under 35 U.S.C. 154(b) by 23 days.

(21) Appl. No.: 19/021,705

(22) Filed: Jan. 15, 2025

(65) Prior Publication Data

US 2025/0154981 A1     May 15, 2025

Related U.S. Application Data

(63) Continuation of application No. PCT/KR2023/010228, filed on Jul. 17, 2023.

(30) Foreign Application Priority Data

Jul. 15, 2022   (KR) ........................ 10-2022-0087769

(51) Int. Cl.
   *F16C 17/10*      (2006.01)
   *B60G 15/06*      (2006.01)
   (Continued)

(52) U.S. Cl.
   CPC .......... *F16C 17/105* (2013.01); *B60G 15/068* (2013.01); *F16C 33/1065* (2013.01);
   (Continued)

(58) Field of Classification Search
   CPC ...... F16C 17/10; F16C 17/105; F16C 17/107; F16C 33/102; F16C 33/1065; F16C 33/20;
   (Continued)

(56) References Cited

U.S. PATENT DOCUMENTS

2018/0106292 A1*   4/2018   Sekine ................... F16C 33/20
2022/0090624 A1*   3/2022   Song ..................... F16C 33/102

FOREIGN PATENT DOCUMENTS

JP        2008175349 A  *  7/2008   ............. F16C 17/18
KR   10-2015-0104208 A     9/2015
(Continued)

*Primary Examiner* — Phillip A Johnson
(74) *Attorney, Agent, or Firm* — Dinsmore & Shohl LLP; Yongsok Choi, Esq.

(57)                  ABSTRACT

A strut bearing assembly for a vehicle includes an upper case which has a through opening through which a strut is configured to pass; a lower case which is relatively rotatably coupled to the upper case and has a through opening through which the strut is configured to pass, wherein a coil spring is installed on an outer circumferential surface of the lower case; and a center plate which is disposed between the upper case and the lower case and rotatably supports the upper case relative to the lower case. The center plate may have a through opening through which the strut is configured to pass and may include a cylindrical vertical portion which extends axially from a radial inner side, an inclination portion which is formed to be inclined downward radially outward from the vertical portion, and a horizontal portion which extends radially outward from the inclination portion.

15 Claims, 7 Drawing Sheets

10

(51) Int. Cl.
    *F16C 33/10*         (2006.01)
    *F16C 33/20*         (2006.01)

(52) U.S. Cl.
    CPC ........ *F16C 33/20* (2013.01); *B60G 2204/418*
               (2013.01); *F16C 2326/05* (2013.01)

(58) Field of Classification Search
    CPC .............. F16C 2326/05; B60G 15/068; B60G
                                2204/418
    See application file for complete search history.

(56)                       References Cited

FOREIGN PATENT DOCUMENTS

| KR | 10-1700924 B1 | 1/2017 |
| KR | 10-2022-0039294 A | 3/2022 |

* cited by examiner

10

100

<u>500</u>

STRUT BEARING ASSEMBLY FOR VEHICLE

CROSS-REFERENCE TO RELATED APPLICATIONS

This application is a continuation of International Application No. PCT/KR2023/010228 filed on Jul. 17, 2023, which claims priority to Korean Patent Application No. 10-2022-0087769 filed on Jul. 15, 2022, the entire contents of which are herein incorporated by reference.

TECHNICAL FIELD

The present disclosure relates to a strut bearing assembly for a vehicle.

BACKGROUND ART

Suspension systems for a vehicle are devices which connect an axle shaft and a vehicle body such that that vibration or shock, applied to the axle from the road when the vehicle travels, is not directly transferred to the vehicle body. Thus, the suspension systems may prevent damage to the vehicle body or freight, and improve the ride quality of the vehicle.

Among suspension systems, as independent suspension type front suspension systems, there are a Wishbone type suspension system and a Macpherson type suspension system. Among them, the Macpherson type suspension system has a simpler structure and superior ride comfort than the Wishbone type suspension system. Thus, the Macpherson type suspension system is widely used in passenger cars.

The Macpherson type suspension system has a structure in which an upper arm is not provided, and instead, a lower part of a strut having a shock absorber built therein is connected integrally to a lower arm through a steering knuckle so that the steering knuckle rotates integrally with the strut at the time of steering. Furthermore, an upper part of the strut is installed to be able to rotate relative to the vehicle body or a chassis via the strut bearing assembly so that the strut may rotate integrally with the steering knuckle.

The strut bearing assembly may comprise an upper case, a lower case, and a center plate disposed therebetween so that relative rotation of the upper case and the lower case is possible. For example, Korean Patent Registration No. 10-1700924 (Patent Document 1) discloses a strut bearing configured to have an upper case, a lower case, and a sliding bearing member (center plate) disposed therebetween.

On the other hand, due to the characteristics of the Macpherson type suspension system, the strut bearing assembly may be subjected to both a longitudinal load (axial load) and a transverse load (radial load). In the strut bearing assembly in the related art disclosed in Patent Document 1, in order to support these loads, the sliding bearing member comprises a thrust sliding bearing portion (vertical portion) and a radial sliding bearing portion (horizontal portion).

However, according to such techniques in the related art, there are issues in which the strut bearing assemblies are vulnerable to transverse loads. In this case, the center plate and the case may be deformed due to the transverse load, which may cause issues such as increased rotational friction resistance and decreased product durability.

Document in Related Art (Patent Document 1) Korean Patent Registration No. 10-1700924 (Registration Date: Jan. 23, 2017)

SUMMARY

Technical Problem

The present disclosure is intended to solve the issues in the related art described above, and the present disclosure is for the purpose of providing a strut bearing assembly for a vehicle which is capable of improving both an axial load bearing capacity and a radial load bearing capacity.

Furthermore, the present disclosure is also for the purpose of providing a strut bearing assembly for a vehicle which is capable of preventing deformation due to a load and improving a rotational friction resistance performance and durability.

Technical Solution

Representative configurations of the present disclosure to achieve the aforementioned purpose are as follows.

According to an example embodiment of the present disclosure, a strut bearing assembly for a vehicle is provided. A strut bearing assembly for a vehicle according to an example embodiment of the present disclosure may comprise: an upper case which has a through opening through which a strut is configured to pass; a lower case which is relatively rotatably coupled to the upper case and has a through opening through which the strut is configured to pass, wherein a coil spring is installed on an outer circumferential surface of the lower case; and a center plate which is disposed between the upper case and the lower case and rotatably supports the upper case relative to the lower case. According to an example embodiment of the present disclosure, the center plate may have a through which the strut is configured to pass and may comprise a cylindrical vertical portion which extends axially from a radial inner side, an inclination portion which is formed to be inclined downward radially outward from the vertical portion, and a horizontal portion which extends radially outward from the inclination portion. According to an example embodiment of the present disclosure, the inclination portion and the horizontal portion may comprise the first contact portion and the second contact portion which are formed to protrude to come into contact with the upper case, respectively.

According to an example embodiment of the present disclosure, the second contact portion of the horizontal portion of the center plate may be configured to be disposed on the same line as a center of a wire of a coil spring installed on a lower outer circumferential surface of the lower case on the basis of an axial direction.

According to an example embodiment of the present disclosure, a point in which the second contact portion of the horizontal portion of the center plate comes into contact with the upper case may be configured to be disposed on the same line as the center of the wire of the coil spring on the basis of the axial direction.

According to an example embodiment of the present disclosure, the first contact portion of the inclination portion of the center plate and the second contact portion of the horizontal portion of the center plate may be configured to be come into point contact with the upper case.

According to an example embodiment of the present disclosure, the first contact portion and the second contact portion of the center plate may be each formed as a cycloid curved surface.

According to an example embodiment of the present disclosure, the vertical portion of the center plate may be configured to support a radial load, the horizontal portion of the center plate may be configured to support an axial load, and the inclination portion of the center plate may be configured to support a composite load including a radial load and an axial load.

According to an example embodiment of the present disclosure, an upper surface of the center plate may be provided with at least one radial pocket (523, 533) which is configured to accommodate a lubricant therein.

According to an example embodiment of the present disclosure, the at least one radial pocket may comprise at least one first pocket, which is formed on an upper surface of the inclination portion of the center plate, to accommodate a lubricant therein.

According to an example embodiment of the present disclosure, a plurality of first pockets may be formed, and the plurality of first pockets may be disposed spaced apart in a circumferential direction to have the first contact portion disposed therebetween.

According to an example embodiment of the present disclosure, the at least one radial pocket may comprise at least one second pocket, which is formed on an upper surface of the horizontal portion of the center plate, to accommodate a lubricant therein.

According to an example embodiment of the present disclosure, a plurality of second pockets may be formed, and the plurality of second pockets may be disposed spaced apart in the circumferential direction to have the second contact portion disposed therebetween.

According to an example embodiment of the present disclosure, the at least one radial pocket may comprise the at least one first pocket which is formed on the upper surface of the inclination portion of the center plate to accommodate a lubricant therein and the at least one second pockets which is formed on the upper surface of the horizontal portion of the center plate to accommodate a lubricant therein, and the at least one first pocket and the at least one second pocket may be disposed on the same line in a radial direction.

According to an example embodiment of the present disclosure, the upper surface of the center plate may comprise at least one circumferential groove portion which is formed in the circumferential direction and configured to accommodate a lubricant therein.

According to an example embodiment of the present disclosure, the at least one circumferential groove portion may be formed to have the same depth as the at least one radial pocket.

According to an example embodiment of the present disclosure, at least one groove portion may be formed on an outer lateral surface of the vertical portion of the center plate, and the at least one groove portion is disposed radially on the same line as the at least one radial pocket.

In addition, a strut bearing assembly for a vehicle according to the present disclosure may further comprise other additional constituent elements as long as they do not harm the technical idea of the present disclosure.

Advantageous Effects of Invention

According to the present disclosure, through a structure of a center plate comprising a vertical portion, an inclination portion, and a horizontal portion, it is possible to effectively distribute an axial load and a radial load to improve a load bearing capacity, and thus it is possible to prevent deformation of the center plate and a case due to a load.

Further, according to the present disclosure, by minimizing contact areas between the center plate and an upper case and maximizing lubricant storage and fluidity between the center plate and the upper case, it is possible to improve a rotational friction resistance performance and durability.

EXPLANATION OF REFERENCE NUMERALS

Figure 1:
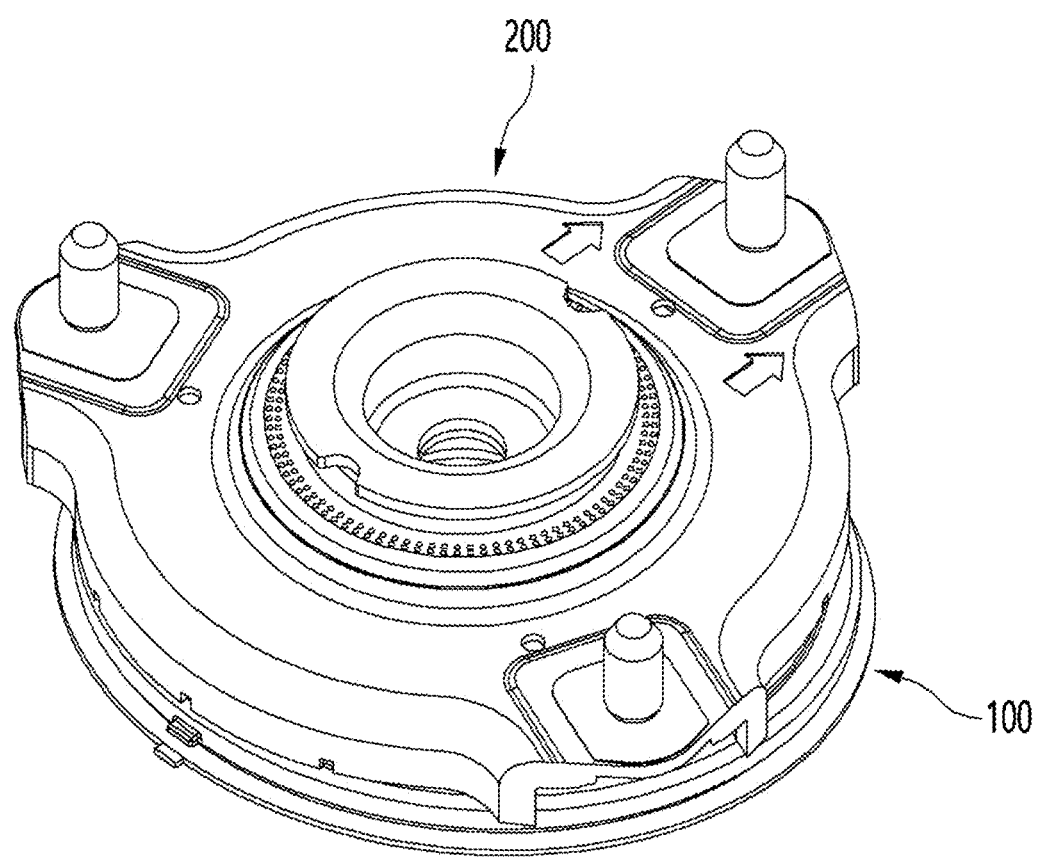
FIG. 1 exemplarily shows an example of a top mount assembly comprising a strut bearing assembly for a vehicle according to an example embodiment of the present disclosure.

100: Strut bearing assembly for vehicle
200: Insulator
300: Upper case
400: Lower case
500: Center plate
510: Vertical portion
513: Groove portion
520: Inclination portion
521: First contact portion
523: First pockets
530: Horizontal portion
531: Second contact portion
533: Second pockets
535: Bump portion
541: First circumferential groove portion
543: Second circumferential groove portion

DETAILED DESCRIPTION

The example embodiments which will be described below are provided for the purpose of explaining the technical ideas of the present disclosure and the scope of the rights of the present disclosure is not limited to the example embodiments which will be presented below or the specific descriptions thereof.

All technical and scientific terms used in this specification, unless otherwise defined, have the meaning commonly understood by a person of ordinary skill in the art to which the present disclosure belongs. In addition, all terms used in this specification have been selected for the purpose of more clearly describing the present disclosure and have not been selected to limit the scope of the rights of the present disclosure.

The expressions "comprising," "including," "having," and the like, as used herein, are to be understood as open-ended terms implying the possibility of including other example embodiments, unless otherwise stated in the phrase or sentence in which the expression is included.

In this specification, an "axial direction" means a direction in which a strut passes through a strut bearing assembly and extends in a direction of a central axis of the strut, a "radial direction" means a direction in which it is away from or closer to the central axis in a direction perpendicular to the "axial direction," and a "circumferential direction" means a direction of rotation centering on the "axial direction."

The singular forms used in this specification may include plural meanings unless otherwise stated and the same applies to the singular forms used in the claims.

When it is described in this specification that a constituent element is "located" or "formed" on one side of another constituent element, it needs to be understood that the constituent element may be located or formed in direct contact with one side of the other constituent element or may be located or formed with another new constituent element interposed therebetween. Furthermore, although the location relationship of the constituent elements is described as an upper portion (top) and a lower portion (bottom) on the basis of a height direction of the vehicle in this specification, the present disclosure is not limited thereto.

Preferred example embodiments of the present disclosure will be described in detail below with reference to the attached drawings to an extent that a person skilled in the art to which the present disclosure belongs can easily practice the present disclosure. In the attached drawings, the same or corresponding constituent elements are indicated by the same reference numerals, and in the description of the example embodiments which will be described below, duplicate description of identical or corresponding constituent elements may be omitted. Here, even if description of a particular constituent element is omitted in the description which will be provided below, this is not intended to mean that such a constituent element is not included in the example embodiment.

FIG. 1 exemplarily shows a top mount assembly comprising a strut bearing assembly for a vehicle according to an example embodiment of the present disclosure.

Referring to FIG. 1, a top mount assembly 10 according to an example embodiment of the present disclosure may comprise a strut bearing assembly 100 and an insulator 200.

A strut (not shown) has a shock absorber built therein, and a coil spring may be provided on an outer circumferential surface of the strut. An upper end portion of the strut passes through the strut bearing assembly 100 and is connected to the vehicle body via the insulator 200, and a lower end portion of the strut is coupled to a knuckle. The strut is configured to rotate relative to the vehicle body in accordance with the steering of a wheel.

The insulator 200 has an upper plate, a lower plate, and a rubber bushing disposed between these, is connected to the vehicle body, and may perform a function of absorbing shocks from the road surface transmitted through the strut when the vehicle is traveling and reducing shocks and vibrations transmitted to the vehicle body.

The strut bearing assembly 100 has a through opening through which the strut passes and is configured to be connected to the vehicle body via the insulator 200.

Figure 2:
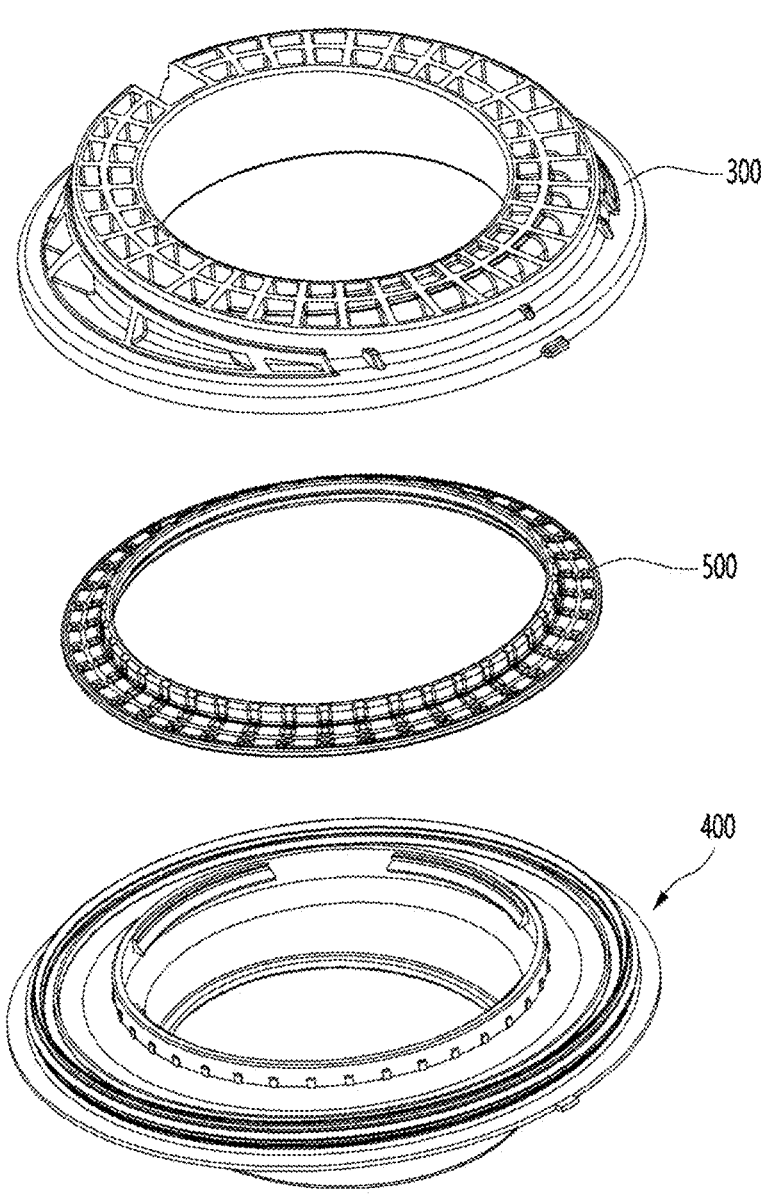
FIG. 2 exemplarily shows an exploded perspective view of a strut bearing assembly for a vehicle according to an example embodiment of the present disclosure.

FIG. 2 exemplarily shows an exploded perspective view of a strut bearing assembly for a vehicle according to an example embodiment of the present disclosure. Further, FIG. 3 exemplarily shows a cross-sectional structure of a top mount assembly comprising the strut bearing assembly for a vehicle according to an example embodiment of the present disclosure. Hereafter, a structure of the strut bearing assembly 100 will be described in detail with reference to FIG. 2 and FIG. 3.

The strut bearing assembly 100 according to an example embodiment of the present disclosure may have a sliding bearing structure comprising an upper case 300, a lower case 400, and a center plate 500 disposed therebetween.

According to an example embodiment of the present disclosure, the upper case 300 is configured to be coupled to the lower portion of the insulator 200. The upper case 300 may be formed to have a hollow structure whose central portion has a through opening through which the strut passes.

According to an example embodiment of the present disclosure, the lower case 400 may be installed below the upper case 300 and may be configured to rotate relative to the upper case 300. Such a structure allows the shock absorber to absorb the load during rotational movement.

As in the upper case 300, the lower case 400 may be formed to have a hollow structure whose central portion has a through opening through which the strut is configured to pass.

According to an example embodiment of the present disclosure, the center plate 500 is disposed between the upper case 300 and the lower case 400 and may be formed to have a hollow structure whose central portion has a through opening as in the upper case 300 and the lower case 400.

The center plate 500 may support the upper case 300 so that the upper case 30 is able to rotate relative to the lower case 400. Specifically, the center plate 500 may support the load transmitted through an insulator 100 while allowing free rotation between the upper case 300 and the lower case 400.

The center plate 500 may be formed of a synthetic resin material having excellent sliding performance and may be made of a material having lower rigidity than the lower case 400. For example, the center plate 500 may be made of polybutylene terephthalate (PBT) which has good rigidity, wear resistance, and self-lubrication.

Figure 3:
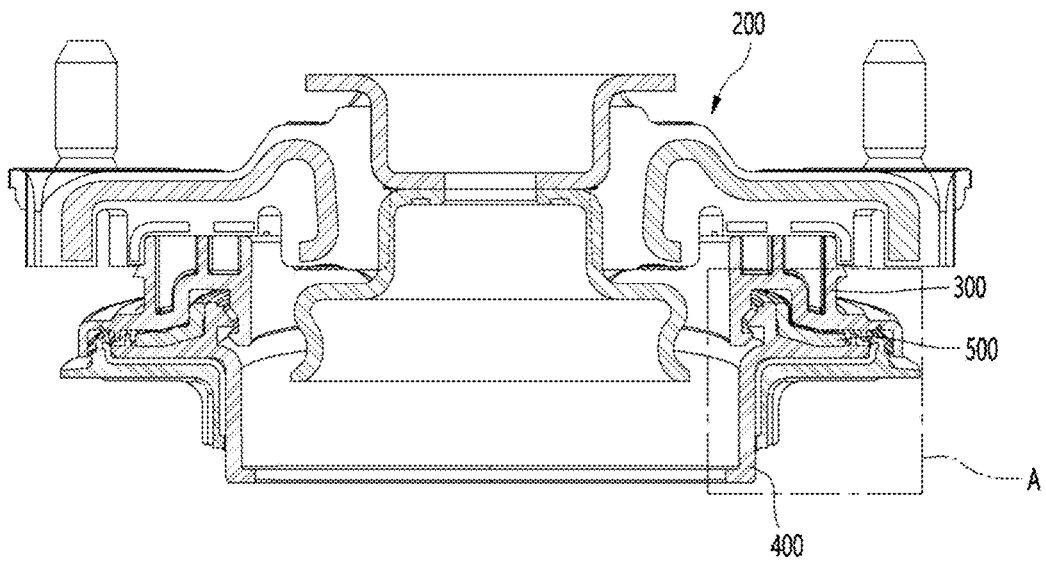
FIG. 3 exemplarily shows a cross-sectional structure of a top mount assembly comprising a strut bearing assembly for a vehicle according to an example embodiment of the present disclosure.
Figure 4:
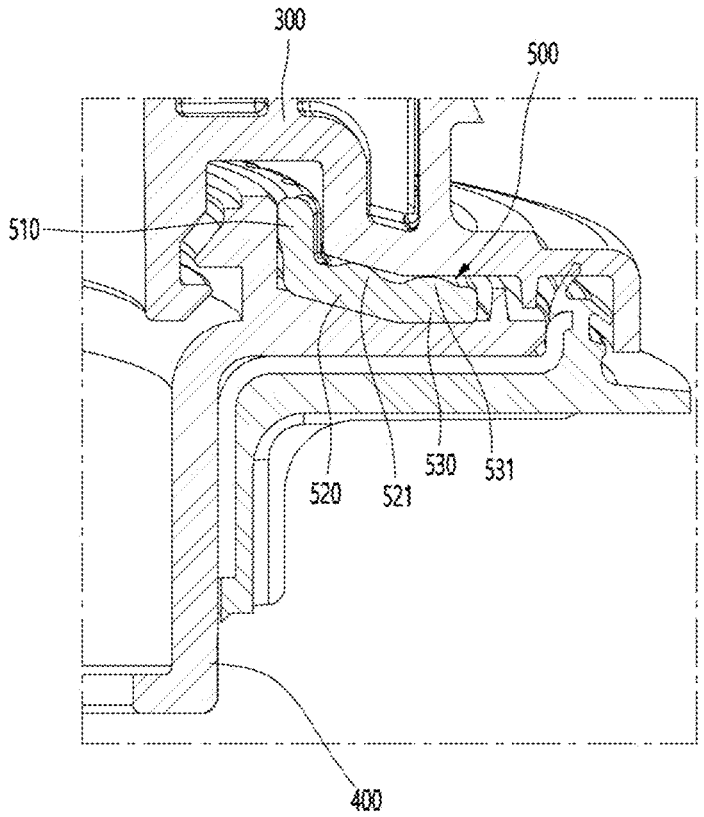
FIG. 4 is an enlarged cross-sectional view of part A of FIG. 3.

FIG. 4 is an enlarged cross-sectional view of part A of FIG. 3 (that is, the center plate part). Furthermore, in reference to FIG. 4, the center plate 500 may comprise a vertical portion 510, an inclination portion 520 and a horizontal portion 530. Moreover, the lower case 400 may have a vertical region, an inclination region and a horizontal region formed to correspond to each of the vertical portion 510, the inclination portion 520, and the horizontal portion 530 of the center plate 500, and the vertical portion 510, the inclination portion 520, and the horizontal portion 530 of the center plate 500 may be pressed and coupled in the corresponding regions of the lower case 400.

The vertical portion 510 of the center plate 500 may be formed to have a cylindrical shape in which it is located radially inward and extends axially. The inclination portion 520 of the center plate 500 may be formed to be inclined downward radially outward from the vertical portion 510 and the horizontal portion 530 may be formed to extend radially outward from the inclination portion 520. That is to say, the inclination portion 520 may be formed to extend in a direction inclined with the radial direction and the horizontal portion 530 may be formed to extend parallel to the radial direction (that is, perpendicular to the axial direction).

The inclination portion 520 and the horizontal portion 530 of the center plate 500 may comprise contact portions 521 and 531 configured to come into contact with the upper case 300 and support a load, respectively. Specifically, according to an example embodiment of the present disclosure, the first contact portion 521 protruding upwardly may be formed on an upper surface of the inclination portion 520 of the center plate 500 and the second contact portion 531 protruding upwardly may be formed on an upper surface of the horizontal portion 530 of the center plate 500. The first contact portion 521 of the inclination portion 520 and the second contact portion 531 of the horizontal portion 530 may each be configured to come into contact with the upper case 300.

Figure 5:
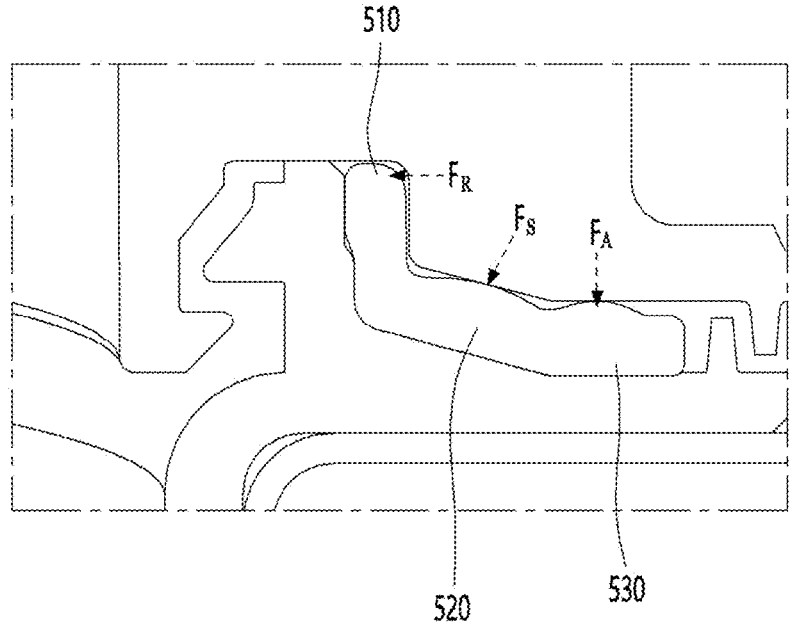
FIG. 5 exemplarily shows loads applied to a center plate in a strut bearing assembly for a vehicle according to an example embodiment of the present disclosure.

FIG. 5 exemplarily shows loads applied to a center plate in a strut bearing assembly for a vehicle according to an example embodiment of the present disclosure.

Referring to FIG. 5, the vertical portion 510 of the center plate 500 may support a transverse load (that is, a radial load FR) and the horizontal portion 530 may support an axial load $F_A$. Further, the inclination portion 520 may support a composite load $F_S$ obtained by combining a transverse load and an axial load.

As such, the center plate 500 may support loads in each of the vertical portion 510, the inclination portion 520, and the horizontal portion 530. Particularly, the vertical portion 510 and the inclination portion 520 may support a transverse load and the horizontal portion 530 and the inclination portion 520 may support an axial load. Thus, transverse load and the axial load may be supported in a distributed manner, and it is possible to improve a transverse load bearing capacity and an axial load bearing capacity.

Therefore, according to an example embodiment of the present disclosure, the center plate 500 and the cases 300, 400 may be prevented from being deformed by effectively distributing the load to improve the load bearing capacity, and thus it is possible to reduce the rotational friction resistance of the strut bearing assembly 100 and it is possible to improve durability.

According to an example embodiment of the present disclosure, the center plate 500 has a contact portion in contact with the upper case 300 which has a structure in which it effectively distributes the load.

According to an example embodiment of the present disclosure, an inclination angle of the inclination portion 520 of the center plate 500 may be determined to be an angle in which it minimizes the stress in each member in consideration of the loads applied to the upper case 300, the lower case 400, and the center plate 500. In an example embodiment of the present disclosure, a radial load may be supported not only through the vertical portion 510 of the center plate 500 but also through the inclination portion 520 of the center plate 500, and particularly, it is possible to improve the bearing capacity of the radial load by optimizing the inclination angle of the inclination portion 520 of the center plate 500.

According to an example embodiment of the present disclosure, the first contact portion 521 of the inclination portion 520 of the center plate 500 and the second contact portion 531 of the horizontal portion 530 of the center plate 500 may each be configured to come into contact with the upper case 300. As an example, the first contact portion 521 of the inclination portion 520 of the center plate 500 and the second contact portion 531 of the horizontal portion 530 of the center plate 500 may each be formed as a cycloid curved surface. Here, the cycloid curved surface refers to a curved surface whose cross-section is formed to have a cycloid curve. As such, when the first contact portion 521 and the second contact portion 531 of the center plate 500 are in point contact with the upper case 300, it is possible to reduce the rotational friction resistance.

According to an example embodiment of the present disclosure, the second contact portion 531 provided on the horizontal portion 530 of the center plate 500 may be disposed axially on the same line as a center of a wire of the coil spring disposed outside the lower case 400.

Figure 6:
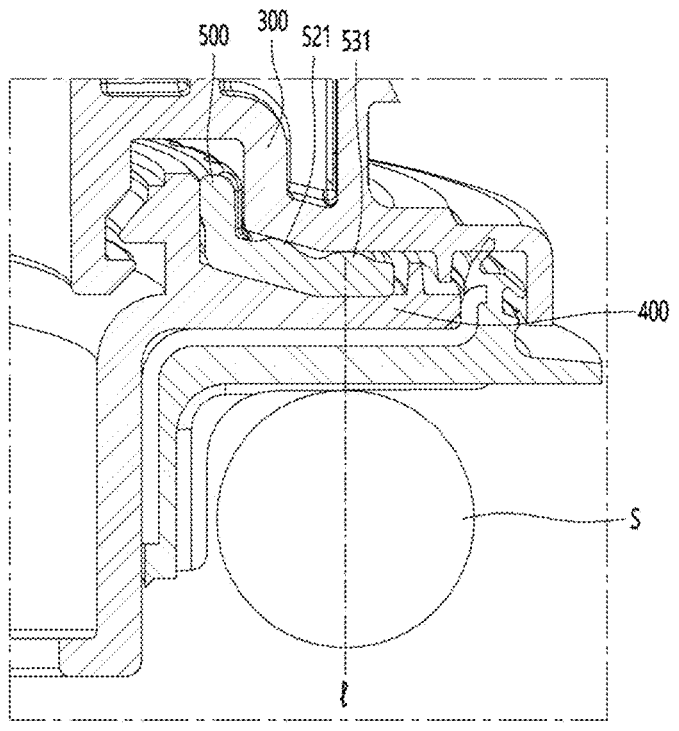
FIG. 6 exemplarily shows a location relationship between a center plate and a coil spring according to an example embodiment of the present disclosure.

FIG. 6 exemplarily shows a location relationship between a center plate and a coil spring according to an example embodiment of the present disclosure.

Referring to FIG. 6, a coil spring S may be disposed on the lower outer circumferential surface of the lower case 400, and a straight line 1 passing through the center of the wire of the coil spring S and parallel to the axial direction may pass through the second contact portion 531 of the horizontal portion 530 of the center plate 500.

That is to say, the second contact portion 531 of the horizontal portion 530 of the center plate 500 and the wire center of the coil spring(S) may be disposed on the same line in the axial direction. Preferably, a region in which the second contact portion 531 of the horizontal portion 530 is in contact with the upper case 300 and the center of the wire of the coil spring S may be disposed on the same line. More preferably, the center of the region in which the second contact portion 531 of the horizontal portion 530 is in contact with the upper case 300 and the center of the wire of the coil spring S may be disposed on the same line.

The horizontal portion 530 of the center plate 500 may support the axial load through the second contact portion 531. When the second contact portion 531 is disposed on the same line as the center of the wire of the coil spring S, it is possible to more effectively distribute the axial load due to a buffering action of the coil spring S.

Figure 7A:
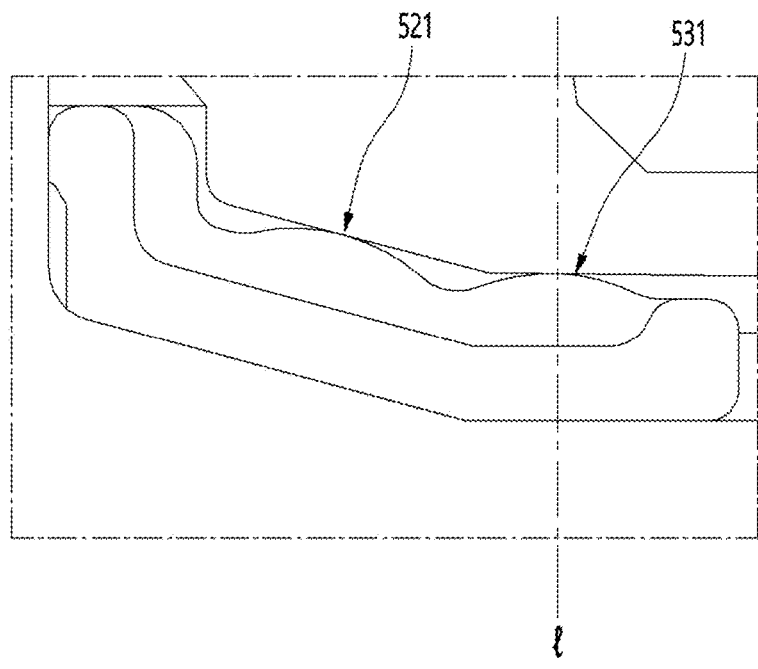
FIGS. 7A and 7B exemplarily show a center plate according to an example embodiment of the present disclosure and a center plate according to a comparative example.
Figure 7B:
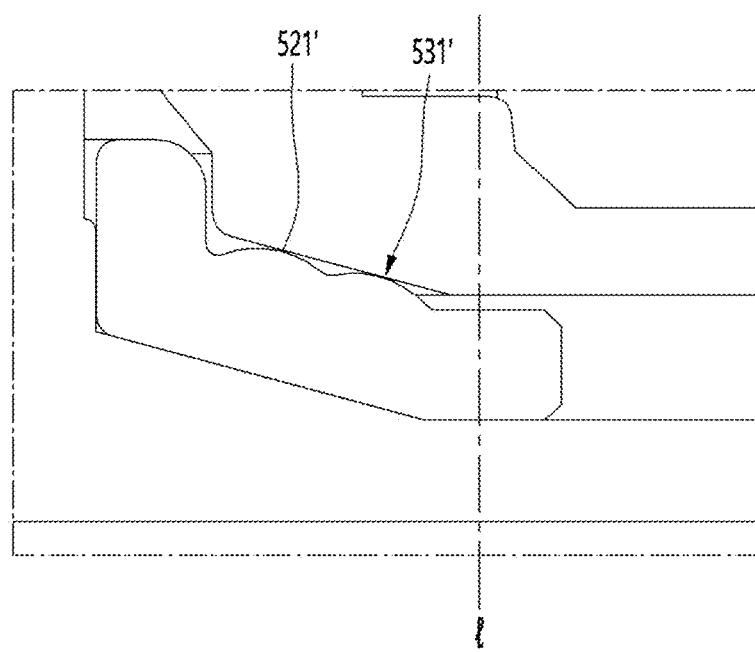

FIGS. 7A and 7B exemplarily shows center plates according to an example embodiment of the present disclosure and a comparative example. Specifically, in FIG. 7A, the contact portions 521 and 531 are formed on the inclination portion 520 and the horizontal portion 530 of the center plate 500, respectively, and the contact portion 531 provided on the horizontal portion 530 is disposed on the straight line 1 which passes through the center of the wire of the coil spring S and is parallel to the axial direction. In FIG. 7B, two contact portions 521' and 531' are formed on the inclination portion of the center plate and these contact portions 521' and 531' are disposed radially inward relative to the straight line 1 which passes through the center of the wire of the coil spring S and is parallel to the axial direction. That is to say, the comparative example of FIG. 7B differs from the example embodiment of FIG. 7A in that the contact portion is formed only on the inclination portion of the center plate and not on the horizontal portion and the contact portion formed on the inclination portion of the center plate is not disposed on the straight line 1 passing through the center of the wire of the coil spring S and parallel to the axial direction.

Figure 8:
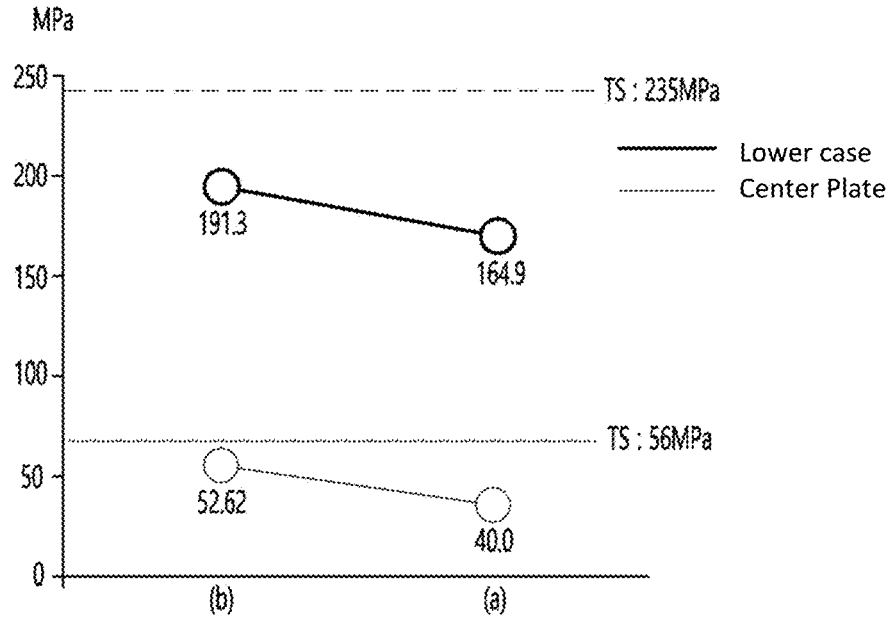
FIG. 8 shows stress distributions according to the example embodiment and the comparative example of FIGS. 7A and 7B.

FIG. 8 shows a stress distribution according to an example embodiment and the comparative example of FIGS. 7A and 7B.

Referring to FIG. 8, it can be seen that, when the contact portions 521 and 531 are formed on the inclination portion 520 and the horizontal portion 530 of the center plate 500, respectively, and the contact portion 531 of the horizontal portion 530 is disposed on the same line as the center of the wire of the coil spring S, as in an example embodiment of the present disclosure, stresses in the lower case and the center plate are significantly reduced. Specifically, it can be seen that, compared to the comparative example in FIG. 7B, a maximum stress in the center plate is reduced by about 24.0% and a maximum stress in the lower case is reduced by about 11.3%.

As such, according to an example embodiment of the present disclosure, the load applied to the center plate and the lower case may be effectively distributed, and stress may be reduced. Therefore, it is possible to significantly reduce the height deformation of the center plate, and as the height deformation of the center plate is reduced, it is possible to maintain a contact region with the upper case and it is possible to prevent the occurrence of an additional contact portion. In this way, it is possible to significantly reduce the rotational friction resistance by preventing deformation of the center plate and preventing the occurrence of an additional contact portion, which not only improves the durability of the strut bearing assembly but also improves torque performance.

On the other hand, according to an example embodiment of the present disclosure, in order to improve lubricity of the strut bearing assembly 100 and reduce rotational friction resistance, a space for accommodating a lubricant therein may be formed on the upper surface of the center plate 500 at a region adjacent to an upper case 300.

Figure 9:
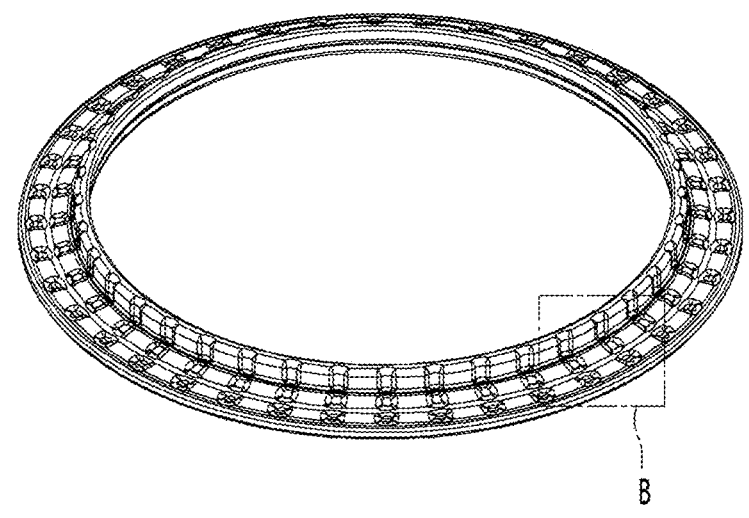
FIG. 9 exemplarily shows a center plate of a strut bearing assembly for a vehicle according to an example embodiment of the present disclosure.
Figure 10:
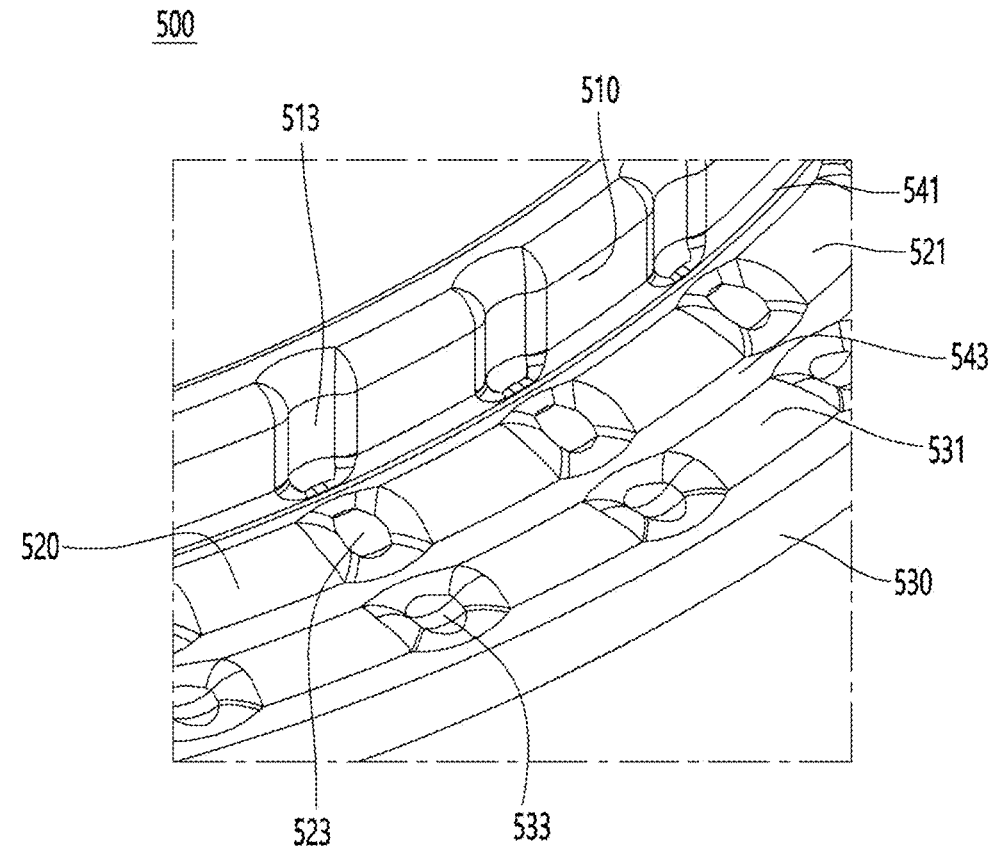
FIG. 10 shows an enlarged view of part B of FIG. 9.

FIG. 9 exemplarily shows a center plate of a strut bearing assembly for a vehicle according to an example embodiment of the present disclosure and FIG. 10 shows an enlarged view of portion B of FIG. 9.

Referring to FIG. 9 and FIG. 10, the upper surface of the center plate 500 according to an example embodiment of the present disclosure may have a plurality of pockets and groove portions formed to accommodate and store a lubricant and prevent external leakage of the stored lubricant. Although grease may be used as a lubricant in an example embodiment of the present disclosure, the present disclosure is not limited to this.

According to an example embodiment of the present disclosure, at least one radial pocket may be formed on an upper surface of the center plate 500 in contact with the upper case 300. Specifically, according to an example embodiment of the present disclosure, first pockets 523 may be formed on an upper surface of the inclination portion 520 of the center plate 500 in contact with the upper case 300 and second pockets 533 may be formed on an upper surface of the horizontal portion 530 of the center plate 500. The first pockets 523 and the second pockets 533 may each be formed radially.

The plurality of first pockets 523 may be formed spaced apart in the circumferential direction to have the first contact portion 521 disposed therebetween and the plurality of second pockets 533 may be formed spaced apart in the circumferential direction to have the second contact portion 531 disposed therebetween. The first pockets 523 and the second pockets 533 may be disposed at regular intervals along the circumference. Furthermore, the first pockets 523 and the second pockets 533 may be disposed on the same line in the radial direction.

According to an example embodiment of the present disclosure, at least one circumferential groove portion may be further formed in the circumferential direction on the upper surface of the center plate 500 in contact with the upper case 300. The at least one circumferential groove portion may comprise a first circumferential groove portion 541 and a second circumferential groove portion 543.

Each of the first circumferential groove portion 541 and the second circumferential groove portion 543 may be formed in the circumferential direction on the upper surface of the center plate 500 and may be formed radially spaced apart from each other. Specifically, the first circumferential groove portion 541 may be formed in the circumferential direction between the vertical portion 510 and the inclination portion 520 and the second circumferential groove portion 543 may be formed in the circumferential direction between the inclination portion 520 and the horizontal portion 530.

According to an example embodiment of the present disclosure, the first circumferential groove portion 541 and the second circumferential groove portion 543 may each be formed at a boundary between the vertical portion 510 and the inclination portion 520 and a boundary between the inclination portion 520 and the horizontal portion 530 (that is, at the point in which an inclination angle changes). The first circumferential groove portion 541 and the second circumferential groove portion 543 may each be formed at a constant depth along the circumferential direction. Furthermore, the first circumferential groove portion 541 and the second circumferential groove portion 543 may be formed at the same depth. According to such a configuration, a circumferential flow of a lubricant between the upper surface case 300 and the center plate 500 may be facilitated.

As shown in the drawing, the first pockets 523 and the second pockets 533, and the first circumferential groove portion 541 and the second circumferential groove portion 543 are disposed adjacent to each other in an intersecting manner and may communicate with each other. The first pockets 523 may be formed to have the same depth as the first circumferential groove portion 541 and the second circumferential groove portion 543 at a portion intersecting with the first circumferential groove portion 541 and the second circumferential groove portion 543. Furthermore, the second pockets 533 may be formed to have the same depth as the second circumferential groove portion 543 at a portion intersecting with the second circumferential groove portion 543.

As such, when the pockets and the groove portions are formed at the same depth at the point in which they intersect each other, the lubricants accommodated in the pockets and groove portions may move smoothly between each of the pockets and the groove portions, thereby ensuring the fluidity of the lubricant, and thus further reducing the rotational friction resistance.

According to an example embodiment of the present disclosure, a bump portion(s) (not shown) may be further formed at an end portion of the horizontal portion 530 of the center plate 500. The bump portion may be formed to have a shape in which it protrudes upward at the end portion of the horizontal portion 530 so that the lubricant may flow in the contact region with the upper case 300 without leaking. For example, the bump portion may be formed to protrude vertically from an end portion of the horizontal portion 530.

According to an example embodiment of the present disclosure, at least one groove portion 513 may be formed on a lateral surface of the vertical portion 510 of the center plate 500, more specifically, on a radial outer surface of the vertical portion 510 which is in contact with the upper case 300. The groove portion 513 formed on the lateral surface of the vertical portion 510 of the center plate 500 may also perform a function of accommodating and storing a lubricant and allowing it to flow smoothly.

The groove portion 513 formed on the lateral surface of the vertical portion 510 of the center plate 500 may be disposed radially on the same line as the first pockets 523 formed on the inclination portion 520 and the second pockets 533 formed on the horizontal portion 530. According to such a configuration, it is possible to further reduce the rotational friction resistance by improving the lubricity between the upper case 300 and the center plate 500.

Although the present disclosure has been described above with reference to specific details such as specific constituent elements and limited examples, the above examples are provided only to help a more general understanding of the present invention and the present disclosure is not limited thereto and those with common knowledge in the technical field to which the present disclosure belongs may make various modifications and variations from this description.

Accordingly, the idea of the present disclosure need not to be limited to the example embodiments described above and not only the claims which will be described below but also all modifications which are equivalent or equivalent to the claims are considered to fall within the scope of the idea of the present disclosure.

What is claimed is:

1. A strut bearing assembly for a vehicle (100), comprising:

an upper case (300) which has a through opening through which a strut is configured to pass;

a lower case (400) which is relatively rotatably coupled to the upper case (300) and has a through opening through which the strut is configured to pass, wherein a coil spring is installed on an outer circumferential surface of the lower case (400); and a center plate (500) which is disposed between the upper case (300) and the lower case (400) and rotatably supports the upper case (300) relative to the lower case (400), wherein the center plate (500) has a through opening through which the strut is configured to pass and comprises a cylindrical vertical portion (510) which extends axially from a radial inner side, an inclination portion (520) which is formed to be inclined downward radially outward from the vertical portion (510), and a horizontal portion (530) which extends radially outward from the inclination portion (520), and wherein the inclination portion (520) and the horizontal portion (530), respectively, comprise a first contact portion (521) and a second contact portion (531) that are formed to protrude to come into contact with the upper case (300), respectively.

2. The strut bearing assembly for a vehicle of claim 1, wherein the second contact portion (531) of the horizontal portion (530) of the center plate (500) is configured to be disposed on the same line as a center of a wire of a coil spring(S) installed on a lower outer circumferential surface of the lower case (400) on the basis of an axial direction.

3. The strut bearing assembly for a vehicle of claim 2, wherein a point in which the second contact portion (531) of the horizontal portion (530) of the center plate (500) comes into contact with the upper case (300) is configured to be disposed on the same line as the center of the wire of the coil spring(S) on the basis of the axial direction.

4. The strut bearing assembly for a vehicle of claim 1, wherein the first contact portion (521) of the inclination portion (520) of the center plate (500) and the second contact portion (531) of the horizontal portion (530) of the center plate (500) are configured to be come into point contact with the upper case (300).

5. The strut bearing assembly for a vehicle of claim 1, wherein the first contact portion (521) and the second contact portion (531) of the center plate (500) are each formed as a cycloid curved surface.

6. The strut bearing assembly for a vehicle of claim 1, wherein the vertical portion (510) of the center plate (500) is configured to support a radial load, the horizontal portion (530) of the center plate (500) is configured to support an axial load, and the inclination portion (520) of the center plate (500) is configured to support a composite load including a radial load and an axial load.

7. The strut bearing assembly for a vehicle of claim 1, wherein an upper surface of the center plate (500) is provided with at least one radial pocket (523, 533) which is configured to accommodate a lubricant therein.

8. The strut bearing assembly for a vehicle of claim 7, wherein the at least one radial pocket (521) comprises at least one first pocket (523), which is formed on an upper surface of the inclination portion (520) of the center plate (500), to accommodate a lubricant therein.

9. The strut bearing assembly for a vehicle of claim 8, wherein a plurality of first pockets (523) are formed, and the plurality of first pockets (523) are disposed spaced apart in a circumferential direction to have the first contact portion (521) disposed therebetween.

10. The strut bearing assembly for a vehicle of claim 7, wherein the at least one radial pocket (521) comprises at least one second pocket (531), which is formed on an upper surface of the horizontal portion (530) of the center plate (500), to accommodate a lubricant therein.

11. The strut bearing assembly for a vehicle of claim 10, wherein a plurality of second pockets (523) are formed, and the plurality of second pockets (523) are disposed spaced apart in the circumferential direction to have the second contact portion (521) disposed therebetween.

12. The strut bearing assembly for a vehicle of claim 7, wherein the at least one radial pocket (521) comprises the at least one first pocket (523) which is formed on the upper surface of the inclination portion (520) of the center plate (500) to accommodate a lubricant therein and the at least one second pockets (531) which is formed on the upper surface of the horizontal portion (530) of the center plate (500) to accommodate a lubricant therein, and the at least one first pocket (523) and the at least one second pocket (533) are disposed on the same line in a radial direction.

13. The strut bearing assembly for a vehicle of claim 7, wherein the upper surface of the center plate (500) comprises at least one circumferential groove portion (541, 543) which is formed in the circumferential direction and configured to accommodate a lubricant therein.

14. The strut bearing assembly for a vehicle of claim 13, wherein the at least one circumferential groove portion (541, 543) is formed to have the same depth as the at least one radial pocket (523, 533).

15. The strut bearing assembly for a vehicle of claim 1, wherein at least one groove portion (513) is formed on an outer lateral surface of the vertical portion (510) of the center plate (500), and the at least one groove portion (513) is disposed radially on the same line as the at least one radial pocket (523, 533).

* * * * *